Patented Dec. 9, 1952

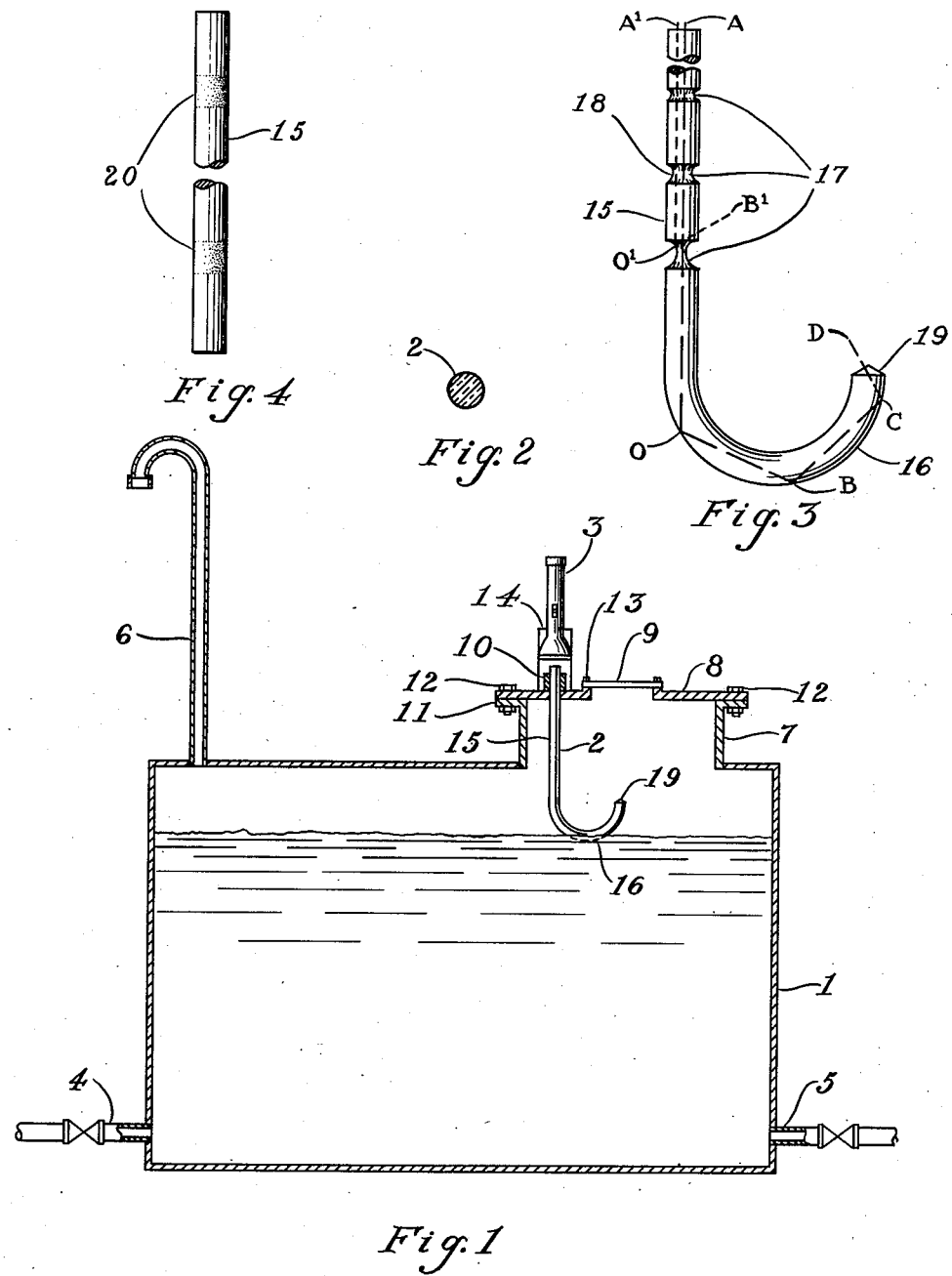

2,620,660

UNITED STATES PATENT OFFICE 2,620,660

LIQUID LEVEL GAUGE

Lester M. Goldsmith, Philadelphia, Pa., assignor to The Atlantic Refining Company, Philadelphia, Pa., a corporation of Pennsylvania Application December 28, 1949, Serial No. 135,412

4 Claims. (Cl. 73—293)

This invention relates to gauges for determining the height or level of material in an enclosed container. More particularly, it relates to a combination of an enclosed container and a gauge, preferably a hook gauge, comprising a light source and a translucent or transparent rod or bar.

Broadly, the invention involves the combination of an enclosed container having a sighting port and a translucent rod or bar associated with the container; a portion of the rod extending and so positioned inside the container such that at least a part thereof is visible from the sighting port and a light source associated with the rod adapted to pass light along the axis thereof. The novel gauge functions as an internally illuminated measuring stick which, when it is inserted in the container and viewed from a sighting port therein, indicates the level of the contents of the container.

In its narrower aspects, the invention involves in combination a hook gauge and an enclosed container having inlet and outlet means and in the top surface thereof a sighting port. The hook gauge comprises a clear, colorless transparent rod, preferably composed of solid polymerized alkyl methacrylate resin in the form of a hook having a relatively long straight leg ending in a U bend. The rod may be slidably and removably attached at its straight leg portion to the container, immediately adjacent the sighting port; the portion of the straight leg of the rod containing the U bend extending downwardly and visible for a major part from the sighting port. The remaining portion of the straight leg of the bar extends through and outside the upper surface of the container and has associated with this end portion a light source adapted to pass light into and downwardly along the longitudinal axis of the bar.

The translucent or transparent rod may be composed of any suitable material such as glass, quartz, synthetic resins and the like, and much material may be colored or colorless. In general, clear, colorless, transparent rods are preferred and they are preferably composed of synthetic resins, especially resins which are made from vinyl type compounds, such as polymerized esters of acrylic acid, polymerized methacrylic acid esters, polymerized vinyl esters, polystyrene, etc. or copolymers of these esters. The preparation of these resins is well known in the art. For best results, it is preferred that the gauge be made of a colorless, transparent material comprising methacrylic esters which produce hard polymers, such as methyl, ethyl, propyl, isopropyl, butyl, secondary and tertiary butyl methacrylates and copolymers of the methacrylic esters with other polymerizable compounds such as the acrylic and methacrylic esters, nitriles, etc., and mono vinyl compounds such as vinyl acetate. Of these polymers, polymerized methyl methacrylate is outstanding in its extreme clarity and transparency to light.

Although the invention is not limited to any particular theory, the optical phenomenon in the material transmitting the light is probably relatively simple. Light entering the end of the rod proceeds until it strikes a side boundary, after which it advances by being reflected back and forth from the side or sides of the rod, and remains therein until it reaches the opposite end or until it strikes a point where the surface is sufficiently disturbed to cause it to leave the rod. The preferred polymers being colorless and crystal clear show almost no absorption of the light passing through them. This property together with their cheapness, easy machinability, and thermoplasticity make them especially useful in my invention.

It is probable also that to the extent to which it takes place in the rod, the internal reflection regulates the passage of the light through it and is dependent upon the so-called critical angle of the material. The critical angle is that angle at which light enters the material when it strikes the material at the greatest possible angle with the perpendicular at the point of contact; that is to say, when light strikes the material at an angle that is practically parallel to its surface, the angle at which the light enters the material is the critical angle. This angle is dependent upon the coefficient of diffraction for the material and when the internal angle of incidence is less than the critical angle, the light will not be reflected internally but will instead pass out of it; conversely when the angle of incidence is greater than the critical angle, the light cannot escape therefrom but is reflected and rebounds from surface to surface in its passage inside the material. When any portion of the rod is curved, the outer radius of such curvature which will carry the light without serious loss is dependent upon the critical angle, and the diameter or thickness of the rod. In the case of polymerized acrylic acid esters, the critical angle in air is 42.2°, and for rods or bars of this material, such outer radius of curvature should be about three times the diameter or thickness of the rod or bar in order that a desirable amount of light remains within the rod at such curved surfaces. This ratio of the outer radius of curvature to the diameter or thickness of the material may be adhered to for any translucent or transparent material so that a desirably sufficient portion of the light will remain within the material in the curved portion. Where a lower ratio is used correspondingly less light will pass around the curvature so that the light seen at the end of the rod may be of an undesirably low intensity which, if objectionably low, may require a light source of higher intensity at the other end of the rod.

The invention is particularly useful in loading sea-going tankers carrying crude oil. At present, it is the practice during the loading of these ships with such material to open the hatch of a tank and to maintain a watch by a competent person while the oil is coming aboard until the proper level in the tank has been reached. Rapid loading tends to increase emission at the hatch of gaseous material from the oil and, particularly, when the atmosphere is humid, there is presented a considerable hazard due to the collection of inflammable or explosive gases on the tanker deck surfaces. One of the principal advantages and objects of this invention is to overcome this hazard.

The invention may also be used to determine accurately and without hazard the level of liquid propane and similar liquid hydrocarbons in enclosed containers and this is another object and advantage of my invention. Such liquids are usually stored under pressure in spherical containers and heretofore, there has been no safe or satisfactory method for measuring the level of such liquid in such containers. Although the invention is particularly useful in determining the level height in an enclosed container where the liquid gives off obnoxious, explosive, or poisonous fumes, it may be used in connection with any liquid or fluid solid, such as, for example, powdered coal and grain. The invention may also be used in measuring the liquid contents of any container, particularly liquids which are not water-white, such as crude petroleum, various vegetable oils, and the like.

These and other objects and advantages of the invention will be apparent from the description of the drawings. It should be understood, however, that the drawings are given primarily for the purpose of illustration and the invention in its broader aspects is not limited thereto.

Fig. 1 shows in combination a tank provided with a hook gauge.

Fig. 2 is a cross-section of a hook gauge of Fig. 1.

Fig. 3 is a modification of the hook gauge shown in Fig. 1.

Fig. 4 is a gauge of an alternative shape.

Referring now to the drawings; in Fig. 1, the numeral 1 indicates an enclosed container in the form of a tank or compartment which is provided with a clear, colorless, transparent rod in the form of a hook gauge 2, and a source of light 3 for the gauge. The tank 1 is illustrative of the fluid type compartments used in tanker ships for carrying crude petroleum, but may be of any size or shape encountered in any commercial use. As shown, such tank is also provided with suitably valved inlet means 4, outlet means 5, and a vent pipe 6 located in the top of the compartment remote from the gauging device. On the top of the compartment, there is a flanged tank dome or manhead 7 having a cover plate 8 which is provided with a sighting port 9 composed of glass or other suitable transparent material. The port 9 is located adjacent to a packing gland 10 which may slidably and removably engage rod 2 thereby attaching the rod to the container 1. Other appropriate means may be used to either or both removably and slidably attach the rod and such means may be gas-tight. Any suitable means may be used to attach coverplate 8 and sighting plate 9. As shown, coverplate 8 is bolted to the flanged portion 11 of manhead 7 by means of bolts 12. Likewise, plate 9 is bolted to coverplate 8 by bolts 13. Gaskets, not shown, may also be used between flange 11 and cover plate 8 and between sighting plate 9 and coverplate 8.

Mounted on coverplate 8 and preferably attached thereto in any suitable manner such as by welding is the metallic cylinder 14, axially aligned with hook gauge 2. Housed in the cylinder 15 is a suitable source of light; for example, the flash light 3 so positioned as to direct light rays internally of and along the longitudinal axis of gauge 2.

The rod or gauge 2 is preferably hook-like in shape and integrally formed throughout having a relatively long straight leg 15 terminating at point 19 in the U bend 16. As used herein the term "rod" includes a bar and the cross-sectional area of the rod may have any form and may vary in its dimensions. Preferably, however, it is circular in cross-section as shown in Fig. 2, and is of uniform diameter. The gauge may also be provided with a series of marker or position points at appropriate places along its length, such as is illustrated by the numeral 17 in Fig. 3 and the numeral 20 in Fig. 4. These position points may be made by disturbing the surface of the rod at the selected point in any suitable manner, such as roughening the surface by grinding, notching, grooving, etc., or by placing a coating thereon to cause the internal angle of incidence of the light at that point to be less than the critical angle and thereby to cause sufficient light to be reflected out of the rod at such point so as to make it stand out and be visible to an observer. As shown in Fig. 3, the marker positions 17 are partially circular grooves extending around the circumference of the rod and the grooves become deeper as their distance from the light source increases. The lower edge 18 of the groove may be straight or have a larger radius of curvature than the upper edge, thereby permitting drainage in those cases where the container 1 contains liquids.

Instead of the hook-shaped gauge of Figs. 1 and 3, a straight rod such as shown in Fig. 4 may be used and the marker positions 20 may be formed by roughening the surface of the rod at these points. Any other suitable shape may be used with or without such markings; for example, the gauge 2 may be in the form of a large U having two legs 15 or it may be hollow or tubular in form and unsealed or sealed at one or both ends. The gauge may also be given a coating over its entire surface except for the marker points. A suitable material for such coating is silver deposited so as to form an internally reflecting surface at the interface of the silver and the rod, thereby keeping the light within the gauge at all points except the marker points.

When the rod is immersed in air or similar gas, such as exists in an unfilled portion of a container, the light rays proceed through it until they reach a surface from which they are reflected. When the angle of incidence is greater than the critical angle, the light is reflected internally in its forward progress until it reaches the end of the rod as shown in Fig. 3 by the line AOBCD or strikes a surface which is such that the angle of incidence is less than the critical angle and such light is reflected out of the rod at that point. As illustrated by line A'O'B', disturbances of the rod such as are caused by the grooves 17 will cause part at least of the light striking such surfaces to be reflected out of the rod. Thus positions 17 and 19 are visible to an observer. The outer radius of curvature of the U-bend may also cause light to leave the rod; in general, however, if the outer radius of curvature of any curved portion of the rod is about three times or more greater than the diameter or thickness of the rod a sufficient amount of the light will be internally reflected in such portions. Further disturbances of such curved parts of the rod will affect the amount of light retained in it. Thus, for example, when the U-bend is immersed in a different material, particularly a liquid, as compared to air or the gas in the unfilled portion of the container, the amount of light (i. e., its intensity) seen at point 19 diminishes progressively from the first point of contact with the U-bend, and disappears when as is shown in Fig. 1 the level of the liquid is such as to cover one-half of the thickness of the rod at the U-bend.

In practicing the invention, the internally illuminated gauge may be used as a measuring rod which is viewed from the sighting port 9 and from which a part at least but preferably substantially all of the rod within an enclosed container may be seen. The gauge may be inserted into the container at any suitable place but generally it is placed at the top of the container, adjacent the sighting point and remote from the vent pipe or pipes, if any. When a gauge, particularly of the type shown in Fig. 4, is used, the point of immersion or the immersion of the marker position may be observed by the disappearance or the change in the light intensity of these positions. The level of the material is indicated by the length of rod inserted.

For most purposes, especially in measuring the level of liquids, the apparatus of Fig. 1 with the hook gauge having marker positions as illustrated in Figs. 3 and 4 is most useful. The gauge may be inserted into the container with a known length of leg 15 extending into it. The level of the liquid content may be determined accurately by observing the end of the rod 19 which may be conical as shown, or roughened, or otherwise raised so as to scatter light emerging from it. The end of the rod 19 may also be flat. During filling of the container, there is a sharp change in intensity of the light at this point when the liquid first touches the bottom of the U-bend. As the level rises, the intensity of the light decreases and disappears abruptly when one-half of the thickness of the bend is covered, as shown in Fig. 1; thereafter additional level points may be determined by observing the disappearance or change in intensity of the appearance of the light as the liquid level reaches the marker positions 17. When liquid is removed from the container, the reverse process takes place until the U-bend emerges. Alternately, the rod may be slidably moved up or down known distances through the packing gland 10 as the loading or unloading proceeds. In such cases, the apparatus of Fig. 1 may be used and the level of the liquid may be determined by observing point 19 to determine when the liquid touches the bottom of the U-bend and/or when one-half of the thickness of the bend is covered. When the level rises rapidly, the gauge of Fig. 3 may be used in conjunction with this sliding technique. In such cases, the two position points indicated by the U-bend may be used as warning of the approach of the desired level indicated by a marker position 17. In rapid unloading the reverse method may be used and in such case the emergence of an indicator point 17 may serve as the warning.

I claim:

1. A gauge for determining the level of material in an enclosed container having a sighting port in the top surface thereof comprising a solid transparent rod extending from outside the container downwardly thereinto and secured to the container adjacent the sighting port so that a substantial portion of the rod is visible from the sighting port, marker disturbances formed at spaced intervals along the length of the rod, and a light source associated with the end of the rod exteriorly of the container whereby light is passed into and downwardly along the axis of the rod.

2. A gauge for determining the level of material in an enclosed container having a sighting port in the top surface thereof comprising a solid transparent rod extending from outside the container downwardly thereinto and secured to the container adjacent the sighting port so that a substantial portion of the rod is visible from the sighting port, marker disturbances formed at spaced intervals along the length of the rod, and a light source associated with the end of the rod exteriorly of the container whereby light is passed into and downwardly along the axis of the rod, said rod having its lower end turned upwardly to form substantially a U-bend.

3. A gauge for determining the level of material in an enclosed container having a sighting port in the top surface thereof comprising a solid transparent rod extending from outside the container downwardly thereinto and secured to the container adjacent the sighting port so that a substantial portion of the rod is visible from the sighting port, marker disturbances formed at spaced intervals along the length of the rod, and a light source associated with the end of the rod exteriorly of the container whereby light is passed into and downwardly along the axis of the rod, said rod having its lower end turned upwardly to form substantially a U-bend, and said marker disturbances consisting of circumferential grooves.

4. A gauge for determining the level of material in an enclosed container having a sighting port in the top surface thereof comprising a solid transparent rod extending from outside the container downwardly thereinto and secured to the container adjacent the sighting port so that a substantial portion of the rod is visible from the sighting port, marker disturbances formed at spaced intervals along the length of the rod, and a light source associated with the end of the rod exteriorly of the container whereby light is passed into and downwardly along the axis of the rod, said rod having its lower end turned upwardly to form substantially a U-bend, and said marker disturbances consisting of circumferential grooves of progressively greater depth proceeding from the uppermost groove to the lowermost groove.

LESTER M. GOLDSMITH.

REFERENCES CITED

The following references are of record in the file of this patent:

UNITED STATES PATENTS

| Number | Name | Date |
| --- | --- | --- |
| 1,883,971 | Kryzanowsky | Oct. 25, 1932 |
| 1,926,945 | Hipp | Sept. 12, 1933 |
| 2,052,404 | Kearsley | Aug. 25, 1936 |
| 2,190,027 | Jordan | Feb. 13, 1940 |
| 2,468,833 | Murphy | May 3, 1949 |